Jan. 19, 1954     H. J. KIMMERLE     2,666,671
MATERIAL HANDLING APPARATUS
Filed Sept. 3, 1949     2 Sheets-Sheet 1
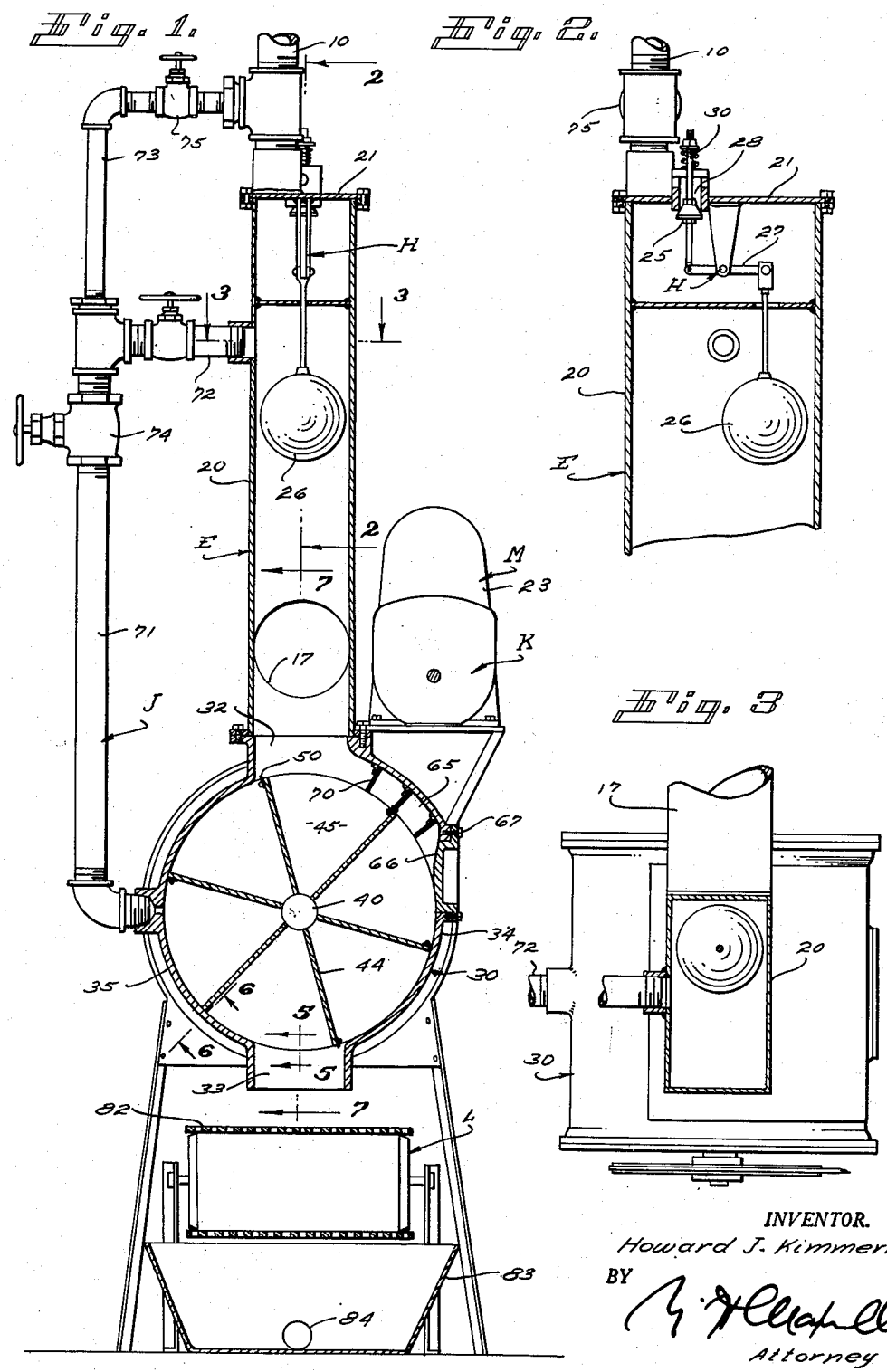
INVENTOR.
Howard J. Kimmerle
BY
Attorney Jan. 19, 1954     H. J. KIMMERLE     2,666,671
MATERIAL HANDLING APPARATUS
Filed Sept. 3, 1949     2 Sheets-Sheet 2
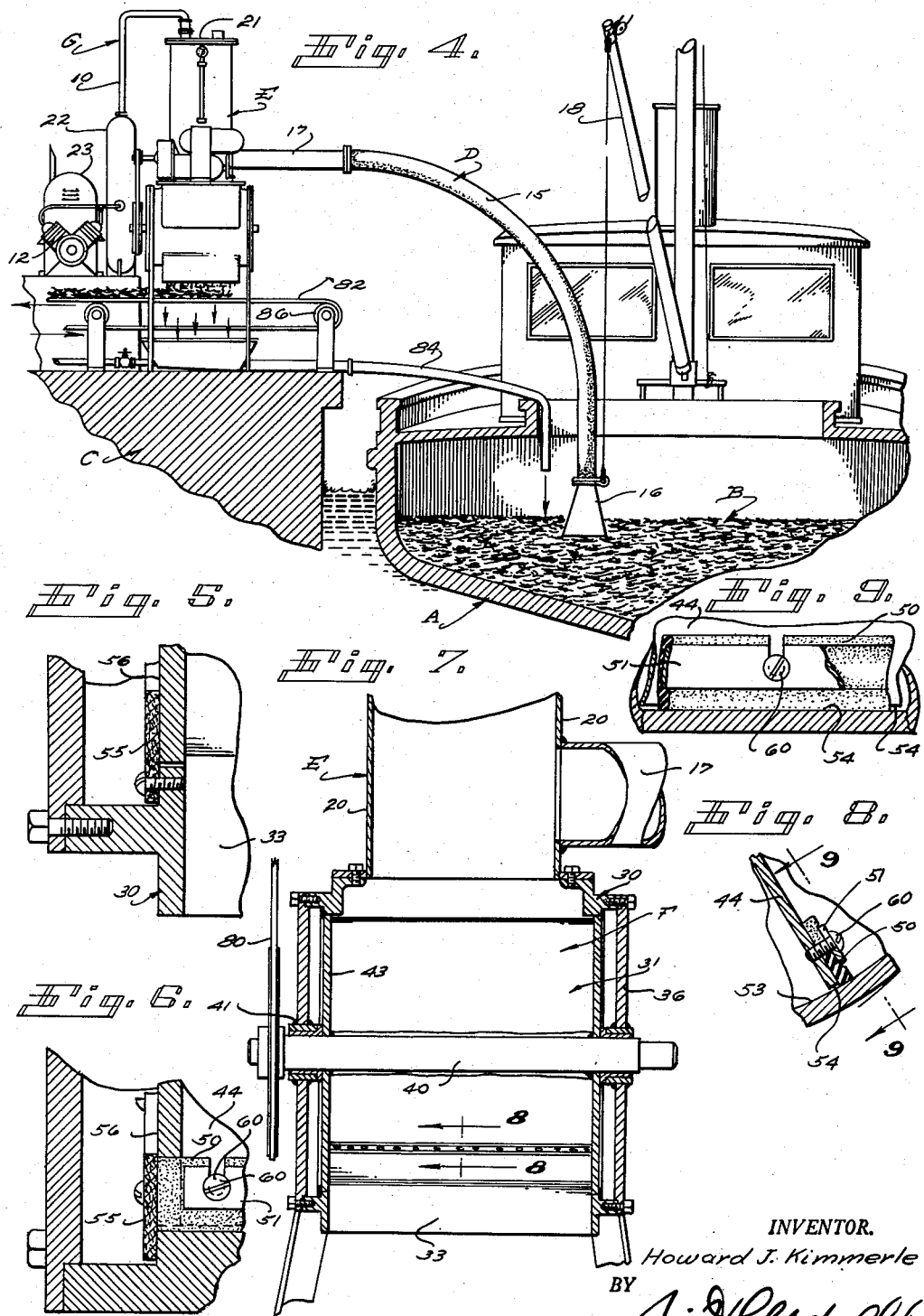
INVENTOR.
Howard J. Kimmerle
BY
Attorney Patented Jan. 19, 1954

2,666,671

UNITED STATES PATENT OFFICE 2,666,671

MATERIAL HANDLING APPARATUS

Howard J. Kimmerle, Los Angeles, Calif.

Application September 3, 1949, Serial No. 113,978

9 Claims. (Cl. 302—14)

This invention is concerned with material handling apparatus and it is a general object of the invention to provide apparatus particularly useful for handling objects or articles in liquids such as water.

There are various situations where articles or objects carried in water or which can be carried in water are desired to be moved, say for instance, elevated. An example of such a situation is where fish are present in a receptacle, possibly in the hull of a boat, and it is desired to deposit the fish at a point such as on a dock, in a cannery, or at any other suitable point.

The present invention provides, generally, a flow line to be submerged in a body of water, or the like, carrying objects or articles such as fish. A tank receives flow from the said line and a means acts to establish and maintain a reduced pressure in the tank above liquid therein, causing a pressure differential to occur between the liquid in the tank and the liquid in the receptacle or vessel, to the end that flow occurs from the vessel to the tank. A control is provided to govern the liquid level in the tank and a flow control is provided at the bottom of the tank to pass material out of the tank at a predetermined rate. The desired sub-atmospheric pressure is maintained in the top of the tank by an air pump that exhausts air from the tank and to the flow control at the bottom of the tank is in the nature of a rotary trap or dumping mechanism. In its preferred form the trap or dumping mechanism involves a cylindrical case which is horizontally disposed and has a top inlet opening receiving material from the tank while a bottom inlet opening located below the inlet opening passes material out of the trap. A rotor operates in the case and has a circumferential series of buckets which move around in the case carrying material received from the tank down at one side of the case to flow out through the outlet and then up at the other side of the case to the inlet. The first mentioned side of the case is enlarged adjacent the inlet and provided with flexible flappers which cooperate with the rotor to prevent objects or articles in the liquid from being caught between the rotor and case and at the said other side of the case means is provided for exhausting air from the pockets of the rotor as they move upwardly, so that they are substantially exhausted before they reach the inlet.

A drive operates the rotor of the control constantly in one direction.

In a preferred application a separator is provided to receive material discharged from the flow control or rotary trap. The separator may include a carrier that catches and carries away the articles or objects while the liquid is received by a catch basin from which it may be discharged or returned to the vessel to maintain a suitable supply of liquid at or in the vessel.

A general object of the present invention is to provide apparatus of the general character referred to which serves to effectively and efficiently handle or move objects or articles by water or like liquid without danger of injuring or mutilating such articles or objects. In the case of fish or the like it is highly important that the handling operation be such as to practically eliminate damage or mutilation such as occurs in the event that such material is passed through a pump, or the like.

It is a further object of the present invention to provide apparatus of the general character referred to which involves few dependable working parts, all of which are subject to simple regulation and will operate uniformly and effectively over a long period of time.

A further object of the present invention is to provide apparatus of the character referred to with a control handling flow from the bottom of the tank, which control is in the nature of a rotary dump mechanism with the various parts sealed, so that there is little or no leakage of air and in which the parts so operate as to handle water carrying objects such as fish without mutilating or damaging the fish in any way.

The various objects and features of my invention will be fully understood from the following detailed description of a typical preferred form and application of the invention, throughout which description reference is made to the accompanying drawings, in which:

Fig. 1 is a vertical sectional view of the principal parts of the apparatus embodying the present invention. Fig. 2 is a view of a part of the mechanism shown in Fig. 1, being a view taken as indicated by line 2—2 on Fig. 1. Fig. 3 is a plan section taken as indicated by line 3—3 on Fig. 1. Fig. 4 is a general view illustrating apparatus of the present invention combined with a vessel in the form of a fishing boat and showing the apparatus serving to deliver fish from the boat to a dock adjacent the boat. Fig. 5 is an enlarged detailed sectional view taken as indicated by line 5—5 on Fig. 1. Fig. 6 is an enlarged detailed sectional view taken as indicated by line 6—6 on Fig. 1. Fig. 7 is a detailed sectional view taken as indicated by line 7—7 on Fig. 1. Fig. 8 is an enlarged detailed sectional view taken as indicated by line 8—8 on Fig. 1, and Fig. 9 is a sectional view taken as indicated by line 9—9 on Fig. 8.

The apparatus of the present invention can be used to advantage to handle various articles or objects which may be floated on or submerged in water or like liquid. For purpose of simplification the liquid handled in the apparatus will be considered as water and a form of the invention will be set forth which is particularly designed for the handling of fish, or the like, fish being material or forming articles or objects that can be advantageously handled by the present invention without damage or mutilation.

In Fig. 4 of the drawings I illustrate a typical use or situation in which the apparatus is used, in which case a container or receptacle in the form of a vessel A carries a body B made up of water and fish. The vessel which may be a typical fishing boat, as shown in the drawings, is adjacent a dock or landing place C and a flow line D extends from a point where it is submerged in the material B to a tank E which, in accordance with the present invention, is a closed vertically disposed tank provided at its bottom with a flow control F. A means G is provided to normally exhaust air from the upper end portion of tank E and as shown in the drawings may include an air line 10 coupled with an air pump 12. Control means H is provided in the upper portion of the tank E to govern the level of liquid maintained in tank E, exhaust means J is provided to exhaust air from buckets or pockets of the control F preliminary to their being filled from the tank E, and a drive means K is provided for operating the control F. In the preferred form of the invention a separator L is provided to receive material from the control F.

The vessel or fishing boat A illustrated in Fig. 4 of the drawings is disclosed merely as a typical means or medium by which a body of material B may be carried ready to be acted upon by the apparatus of the present invention. In the situation illustrated the apparatus of the present invention is employed as an unloading apparatus serving to elevate and convey fish from the hull of the boat to a point where it is convenient to use or handle.

The flow line D may, in practice, be varied widely in form, shape, construction and extent. In a case such as the one illustrated the flow line may be advantageously provided with a flexible outer end portion 15 provided at its outer or receiving end with a funnel-like guide 16 and it may have a simple pipe section 17 extending from the flexible section 15 to the tank E. In a situation of the kind just referred to suitable tackle 18 or the like may be employed to maintain the guide of the flow line D properly submerged in the material B which is to be handled by the line.

The chest or tank E provided by the present invention is preferably an elongate vertically disposed structure which is closed and which may have sides 20 and a top 21. In the preferred arrangement the pipe section 17 of flow line D connects into the tank E through a side 20 close to or in the region of the lower end of the tank as clearly illustrated in Figs. 1, 4 and 7 of the drawings.

The means G which establishes and maintains a reduced pressure in the upper end portion of tank E may, in practice, vary widely as circumstances require. In a case such as illustrated it is advantageous that the means G involves an air pump 12, the suction of which is connected to the upper end portion of tank E to an air line 10 so that air is continuously pumped out of the tank E. The line 10 is shown connected with the tank E through its top 21 and a suitable accumulator or surge tank 22 is shown connected in the air line 10 between the tank E and the pump 12.

It will be understood that the pump 12 can, in practice, be operated or driven in any suitable manner, as for instance by a prime mover 23, or the like.

Through flow of material from the body B through the flow line D and into the tank E by reason of operation of the flow control F, as will be hereinafter described, liquid accumulates in the tank E. The means H operates to control the level of liquid in tank E and in the case illustrated the control means H involves a simple control valve 25 and a float 26 operating in the tank E and coupled with the valve through suitable linkage 27. The valve E controls an escape port 28 which extends through the top 21 of the tank to atmosphere. The arrangement is such that when liquid rises in the tank E and engages the float 26 to move it upwardly the valve 25 is opened allowing air at atmospheric pressure to enter through port 28 thus increasing the pressure in the upper end portion of the tank with consequent lowering of the liquid level in the tank due to decrease in flow through line D. In the particular case illustrated a spring 30 normally yieldingly holds the valve 25 closed and pressure is admitted into the tank E only when the float 26 is moved upwardly.

The flow control F controls the discharge or passage of material out of the bottom of the tank E and is such as to effectively handle material such as water containing or laden with articles or objects such as fish or the like. In accordance with the present invention the control E is, in effect, a rotary trap or dumping mechanism and it may involve a horizontally disposed cylindrical case 30 and a rotor 31 operating in the case.

The case 30 of control F has a cylindrical body which is horizontally disposed and the body of the case is provided at its upper side with an inlet opening or port 32. An outlet port or opening 33 is provided at the bottom of the cylindrical body below or opposite the inlet 32. The case has a side wall 34 extending from the inlet 32 to the outlet 33 and a side wall 35 extending from the outlet 33 to the inlet 32. In the case illustrated the case is closed by ends 36.

The rotor 31 provided in the case just described operates within the cylindrical body of the case and is located between the ends 36 of the case. In the form illustrated the rotor has a central axle or hub 40, the ends of which extend to be rotatably supported in bars 41 provided in the ends 36 of the case. The rotor has end plates 43 which are flat, radially disposed plates located somewhat inward from the ends 36 of the case and radially disposed partitions 44 extend from the hub 40 longitudinally of the rotor between the ends 43 dividing the rotor into a plurality of pockets 45. The pockets form a series that extends circumferentially around the rotor and they open outwardly, as clearly shown in Fig. 1 of the drawings. In the preferred construction the partitions 44 and ends 43 of the rotor extend outwardly to the body of the case, as shown throughout the drawings.

In accordance with the present invention the inlet 32 and the outlet 33 of the case and the pockets 45 around the rotor are so related that at any particular time there is at least one pocket in position to be receiving material from the tank E, while another pocket is positioned to discharge material by gravity through the outlet 33, one or more pockets being at the side wall 35 of the case to be closed thereby.

In accordance with the present invention sealing means are provided between the various parts of the rotor and the case to prevent leakage of air between these elements of the structure. In the case illustrated elongate strips or bodies 50 of the sealing material such as rubber, or the like, are retained at the outer edges of the partitions as by means of plates 51. The sealing strips are such as to engage and have sealing engagement with the inner wall 53 of the case, while the outer edges 54 of the partitions fit the wall 53 with working clearance. In the preferred construction flanges 55 project radially inward from the case adjacent the outer sides 56 of the ends 43 of the rotor to establish a sliding fit therewith. It has been found in practice advantageous to form the rotor of metal and to finish the ends of the rotor where the flanges 55 occur and the flanges 55 are formed of a non-metallic or non-corrosive material such, for example, as Bakelite, or the like. In the preferred arrangement the ends of the sealing strips 50 are extended as shown in Fig. 6 to engage and have sealing engagement with the flanges 55. Further, in the preferred form of the invention the retainers 51, which hold the sealing strips 50 are secured to the partitions 44 by means of screws 60 or like releasable fasteners, and they are adjustable as indicated in Fig. 6, so that they can be moved to hold the sealing strips in the most advantageous manner.

In accordance with the present invention the wall 34 of the case 30 is enlarged adjacent the inlet 32 in the direction in which the rotor travels, as indicated by the arrow in Fig. 1, to establish a recess 65 in this portion of the case, which recess terminates in a wall 66 which is substantially tangential to the periphery of the rotor. In the case illustrated the section of the case at which the wall 66 occurs is made removable, that is, is made as a separable part held in place by releasable fasteners 67, thus providing access to the interior of the structure. In accordance with the invention a plurality of flexible flaps 70 are provided in the recess 60, preferably spaced circumferentially of the structure and preferably elongate, so that they extend lengthwise in the recess. The flaps 70 are preferably formed of rubber or the like and they cooperate with the partitions of the rotor so that as the rotor operates objects such as fish, or the like, tending to catch or jamb between the partitions and the case of the rotor, are deflected or shifted so that they safely lodge in the rotor and thus escape injury or mutilation.

The exhaust means provided by the present invention operates to exhaust air from the pockets 45 of the rotor, as they move upwardly from the outlet 33 to the inlet 32. It will be apparent that a pocket having discharged through the outlet 33 fills with air and if such air were allowed to remain in the pocket it would be carried around and finally discharged into the tank E. The means J provides an exhaust line 71 which extends from the wall 35 of the cylindrical body of the case to a source of low pressure, for instance through a branch 72 to the upper end portion of tank 3 or through a branch 73 to the air line 10, before it reaches tank E. In the case illustrated the exhaust line 71 is provided with a control valve 74 and suitable control valves 75 are provided in the branches 72 and 73. Through these various connections the flow through the exhaust line can be suitably regulated and it can be directed to be through the tank E or through the line 10, or both, as desired.

The drive means K provided for operating the rotor 31 of the flow control may be any suitable means serving to operate the rotor in the direction indicated by the arrow in Fig. 1. It is preferred ordinarily that the rotor be operated constantly and at a uniform speed in the direction indicated. In the case illustrated the drive K involves a prime mover or motor M operatively coupled with the rotor through a suitable flexible drive 80.

The separator L illustrated in the drawings involves a belt conveyor 82 with a portion moving beneath the outlet 33 above described, a catch basin 83 beneath the portion of the conveyor where it receives material from the control F, and a duct 84 which may be extended to any suitable point for discharging the water. In the case illustrated the duct 84 is shown extended to the vessel A so that the water is returned to the vessel in order to maintain an adequate supply of water with the fish being unloaded. It is to be understood that the endless belt 82 may be carried on suitable guides or pulleys 86 and may extend to any desired point remote from the equipment above described.

From the foregoing description it will be apparent that by suitable coordination of the control F at the bottom of the tank E and the means G exhausting air from the top of tank E, a suitable flow is maintained in the flow line D delivering water, and the articles carried by the water, to the tank. The level control H acts to maintain the desired liquid level in the tank. As flow enters the tank the water is free to accumulate in the upper portion of the tank and the fish, being heavier than water, sink to the lower end of the tank so that as material flows out of the tank and into the pockets of the control E, it carries the fish. As the rotor of the control operates as above described, the fish are carried around to the side 34 of the case of the control to be finally discharged through the outlet 33. As the apparatus operates fish are prevented from jambing between the rotor and case through the action of the flap 70 and undesirable air is prevented from being admitted into the lower end of the tank E by reason of the means J which exhausts the air from the pockets as they move upwardly. The separator L effectively separates the fish from the water, allowing the water to be disposed of or returned to the vessel A, as may be required.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. Apparatus adapted to continuously handle a stream of liquid bearing objects including, a flow line with an open inlet end adapted to be submerged in liquid carrying objects, a vertically disposed normally closed tank with an inlet opening in the lower portion thereof to which the discharge end of the flow line is connected, the tank having a bottom outlet opening adapted to continuously pass a stream of liquid bearing objects, flow controlling means adjoining the bottom of the tank and in open communication with the tank through the bottom thereof and including a power driven member adapted to rotate continuously and to pass liquid and objects downwardly from the tank while maintaining a seal against air entering the tank at the bottom thereof, means adapted to continuously exhaust air from the upper end portion of the tank, and means adapted to control the level of liquid in the tank including a member in the tank responsive to the level of liquid therein.

2. Apparatus adapted to continuously handle a stream of liquid bearing objects including, a flow line with an open inlet end adapted to be submerged in liquid carrying objects, a vertically disposed normally closed tank with an inlet opening in the lower portion thereof to which the discharge end of the flow line is connected, the tank having a bottom outlet opening adapted to continuously pass a stream of liquid bearing objects, flow controlling means adjoining the bottom of the tank and in open communication with the tank through the bottom thereof and including a power driven member adapted to rotate continuously and to pass liquid and objects downwardly from the tank while maintaining a seal against air entering the tank at the bottom thereof, means adapted to continuously exhaust air from the upper end portion of the tank to maintain a sub-atmosphere pressure therein, and means adapted to control the level of liquid in the tank including a float in the tank responsive to the level of liquid in the tank and an air valve in the tank open to atmosphere and adapted to be operated by the float.

3. Apparatus adapted to continuously handle a stream of liquid bearing objects including, a flow line with an open inlet end adapted to be submerged in liquid carrying objects, a vertically disposed normally closed tank with an inlet opening in the lower portion thereof to which the discharge end of the flow line is connected, the tank having a bottom outlet opening adapted to continuously pass a stream of liquid bearing objects, flow controlling means adjoining the bottom of the tank and in open communication with the tank through the bottom thereof and including a power driven member adapted to rotate continuously and to pass liquid and objects downwardly from the tank while maintaining a seal against air entering the tank at the bottom thereof, means adapted to continuously exhaust from the flow control means air tending to flow therethrough to the tank, means adapted to continuously exhaust air from the upper end portion of the tank, and means adapted to control the level of liquid in the tank including a member in the tank responsive to the level of liquid therein.

4. Apparatus adapted to continuously handle a stream of liquid bearing objects including, a flow line with an open inlet end adapted to be submerged in liquid carrying objects, a vertically disposed normally closed tank with an inlet opening in the lower portion thereof to which the discharge end of the flow line is connected, the tank having a bottom outlet opening adapted to continuously pass a stream of liquid bearing objects, flow controlling means adjoining the bottom of the tank and in open communication with the tank through the bottom thereof and including a power driven member adapted to rotate continuously and to pass liquid and objects downwardly from the tank while maintaining a seal against air entering the tank at the bottom thereof, means adapted to continuously exhaust air from the upper end portion of the tank to maintain a sub-atmospheric pressure therein, means adapted to control the level of liquid in the tank including a float in the tank responsive to the level of liquid in the tank and an air valve in the tank open to atmosphere and adapted to be operated by the float, and an air duct extending from the flow control means to the tank above the level of liquid therein whereby air is continuously exhausted from said flow controlling means.

5. Apparatus adapted to continuously handle a stream of liquid bearing objects including, a flow line with an open inlet end adapted to be submerged in liquid carrying objects, a vertically disposed normally closed tank with an inlet opening in the lower portion thereof to which the discharge end of the flow line is connected, the tank having a bottom outlet opening adapted to continuously pass a stream of liquid bearing objects, flow controlling means adjoining the bottom of the tank and including a horizontally disposed cylindrical case closed at its ends and having a top inlet opening to the bottom of the tank and having an open bottom outlet opening, and a rotor in the case and in sealing engagement therewith and adapted to turn continuously and having a plurality of pockets carrying liquid and objects from the inlet of the case to the outlet thereof, the pockets of the rotor when at the sides of the case being closed thereby, means adapted to continuously exhaust air from the upper end portion of the tank, and means adapted to control the level of liquid in the tank including a member in the tank responsive to the level of liquid therein.

6. Apparatus adapted to continuously handle a stream of liquid bearing objects including, a flow line with an open inlet end adapted to be submerged in liquid carrying objects, a vertically disposed normally closed tank with an inlet opening in the lower portion thereof to which the discharge end of the flow line is connected, the tank having a bottom outlet opening adapted to continuously pass a stream of liquid bearing objects, flow controlling means adjoining the bottom of the tank and including a horizontally disposed cylindrical case closed at its ends and having a top inlet opening to the bottom of the tank and having an open bottom outlet opening, and a rotor in the case and in sealing engagement therewith and adapted to turn continuously and having a plurality of pockets carrying liquid and objects from the inlet of the case to the outlet thereof, the pockets of the rotor when at the sides of the case being closed thereby, means adapted to continuously exhaust air from the upper end portion of the tank, means adapted to control the level of liquid in the tank including a member in the tank responsive to the level of liquid therein, and means adapted to exhaust air from said pockets at the side of the case where the pockets move up as the rotor turns.

7. Apparatus adapted to continuously handle a stream of liquid bearing objects including, a flow line with an open inlet end adapted to be submerged in liquid carrying objects, a vertically disposed normally closed tank with an inlet opening in the lower portion thereof to which the discharge end of the flow line is connected, the tank having a bottom outlet opening adapted to continuously pass a stream of liquid bearing objects, flow controlling means adjoining the bottom of the tank and including a horizontally disposed cylindrical case closed at its ends and having a top inlet opening connected to the outlet of the tank and having a bottom outlet opening open to atmosphere, and a rotor in the case adapted to turn continuously and having a plurality of pockets carrying material from the inlet of the case to the outlet thereof, the pockets of the rotor when at the sides of the case being closed thereby, one side of the case being enlarged from the inlet in the direction in which the rotor operates, there being flexible flaps in the enlarged portion of the case cooperating with the rotor to prevent material lodging between the case and rotor, means adapted to continuously exhaust air from the upper end portion of the tank, and means adapted to control the level of liquid in the tank including a member in the tank responsive to the level of liquid therein.

8. Apparatus adapted to continuously handle a stream of liquid bearing objects including, a flow line with an open inlet end adapted to be submerged in liquid carrying objects, a vertically disposed normally closed tank with an inlet opening in the lower portion thereof to which the discharge end of the flow line is connected, the tank having a bottom outlet opening adapted to continuously pass a stream of liquid bearing objects, flow controlling means adjoining the bottom of the tank and including a horizontally disposed cylindrical case closed at its ends and having a top inlet opening connected to the outlet of the tank and having a bottom outlet opening open to atmosphere, and a rotor in the case adapted to turn continuously and having a plurality of pockets carrying material from the inlet of the case to the outlet thereof, the pockets of the rotor when at the sides of the case being closed thereby, one side of the case being enlarged from the inlet in the direction in which the rotor operates, there being flexible flaps in the enlarged portion of the case cooperating with the rotor to prevent material lodging between the case and rotor, means adapted to continuously exhaust air from the upper end portion of the tank, means adapted to control the level of liquid in the tank including a member in the tank responsive to the level of liquid therein, and exhaust means adapted to exhaust air from the pockets of the rotor following emptying thereof and as they move upwardly whereby they are at sub-atmospheric pressure when open to receive liquid and objects from the tank.

9. Apparatus adapted to continuously handle a stream of liquid bearing objects including, a flow line with an open inlet and adapted to be submerged in liquid carrying objects to be moved, a vertically disposed normally closed tank with an inlet opening in the lower portion thereof to which the discharge end of the flow line is connected and with a bottom outlet adapted to pass liquid and objects out of the tank under the action of gravity, a flow control means adjacent and connected to the outlet of the tank and adapted to continuously pass and free liquid and objects flowing from the tank while maintaining a seal against passage of air into the tank, means adapted to continuously exhaust air from the upper portion of the tank, means adapted to maintain a substantially uniform level of liquid in the tank whereby a continuous flow of liquid and objects occurs in the line and from the tank, the flow control means including a horizontally disposed cylindrical case closed at its ends and having a top inlet opening connected to the outlet of the tank and having an open freely discharging bottom outlet opening, a rotor in the case adapted to turn continuously and having a plurality of pockets carrying material from the inlet of the case to the outlet thereof, the pockets of the rotor when at the sides of the case being closed thereby and when at the bottom of the case being open to atmosphere, exhaust means adapted to exhaust air from the pockets of the rotor following emptying thereof and as they move upwardly so the pockets are at sub-atmospheric pressure when open to receive liquid and objects from the tank, and means adapted to operate the rotor of the flow control continuously in one direction, the means adapted to continuously exhaust air from the tank including, an exhaust line connected to the upper portion of the tank and an air pump connected to the exhaust line and adapted to operate continuously and to draw air from the tank through the exhaust line.

HOWARD J. KIMMERLE.

References Cited in the file of this patent

UNITED STATES PATENTS

| Number | Name | Date |
|---|---|---|
| 429,493 | Allin | June 3, 1890 |
| 1,321,262 | Townsend | Nov. 11, 1919 |
| 2,159,352 | Chapman | May 23, 1939 |
| 2,293,871 | Whitfield | Aug. 25, 1942 |
| 2,433,408 | Tollefsen | Dec. 30, 1947 |
| 2,440,482 | Martin | Apr. 27, 1948 |
| 2,522,077 | Wahl | Sept. 12, 1950 |

FOREIGN PATENTS

| Number | Country | Date |
|---|---|---|
| 39,290 | Denmark | Sept. 13, 1928 |
| 12,480 | Australia | May 8, 1933 |